United States Patent
Yaita et al.

(10) Patent No.: US 8,052,947 B2
(45) Date of Patent: Nov. 8, 2011

(54) METHOD FOR SELECTIVE SEPARATION OF TRIVALENT AND TETRAVALENT ACTINOIDS FROM TRIVALENT LANTHANOIDS USING HYBRID DONOR TYPE EXTRACTANT HAVING FUNCTIONAL GROUP CARRYING ACTIVE OXYGEN AND NITROGEN ATOMS

(75) Inventors: Tsuyoshi Yaita, Hyogo (JP); Hideaki Shiwaku, Hyogo (JP); Shinichi Suzuki, Ibaraki (JP); Yoshihiro Okamoto, Hyogo (JP)

(73) Assignee: Japan Atomic Energy Agency, Ibaraki (JP)

( * ) Notice: Subject to any disclaimer, the term of this patent is extended or adjusted under 35 U.S.C. 154(b) by 142 days.

(21) Appl. No.: 12/448,556

(22) PCT Filed: Dec. 26, 2007

(86) PCT No.: PCT/JP2007/074950
§ 371 (c)(1),
(2), (4) Date: Jun. 25, 2009

(87) PCT Pub. No.: WO2008/081814
PCT Pub. Date: Jul. 10, 2008

(65) Prior Publication Data
US 2009/0320646 A1    Dec. 31, 2009

(30) Foreign Application Priority Data
Dec. 26, 2006 (JP) ................... 2006-349646

(51) Int. Cl.
*B01D 11/00* (2006.01)
(52) U.S. Cl. .......................................... 423/9; 423/21.5
(58) Field of Classification Search ............. 423/9, 21.5
See application file for complete search history.

(56) References Cited

FOREIGN PATENT DOCUMENTS
JP    2002-243890    8/2002
JP    2005-214706    8/2005

OTHER PUBLICATIONS

International Search Report for PCT/JP2007/074950, mailed Apr. 15, 2008.
Masahiko Numakura, "XAFS to shigai Kashi Kyushu Hiraki Spectrum ni yoru Alcohol Yoeikichu deno Lanthanoid-1,10-phenanthroline Sakutai no Kozo Kaisekil", CSJ: The Chemical Society of Japan Koen Yokoshu, Mar. 2006, Dai 86 Kai, p. 353.
Tsuyoshi Yaita, "Kyomei X-sen Hakko Bunko Bunseki ni yoru Cm Kagobutsu no Denshi Jotai", Hosha Kaguka Toronakai Koen Yokoshu, Oct. 2006, Dai 50, Kai, p. 72.

*Primary Examiner* — Steven Bos

(57) ABSTRACT

A method for separating and recovering trivalent and tetravalent actinoids in a simple and less costly manner without using an organophosphorus compound is provided. This method selectively separates and recovers the tetravalent actinoid plutonium Pu (IV) and the trivalent actinoids americium Am (III) and curium Cm (III) from trivalent lanthanoids Ln (III), etc. with the use of an extractant having a functional group with neutral multidentate ligand activity which is a hybrid donor type organic compound having both of donor atoms, i.e., an oxygen atom and a nitrogen atom.

4 Claims, 1 Drawing Sheet

*FP: Nuclear fission products
**LL: Low radioactivity level

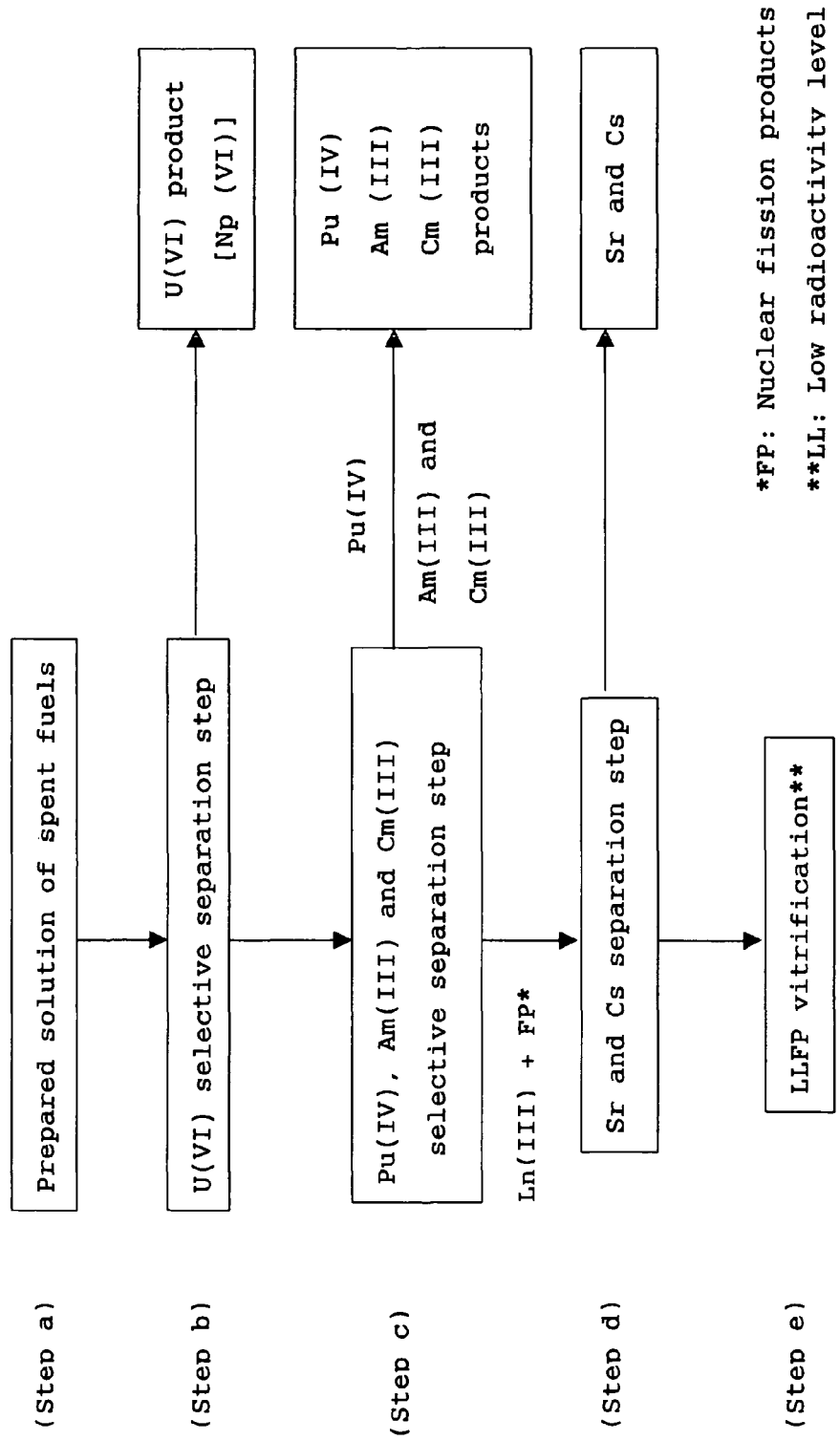

METHOD FOR SELECTIVE SEPARATION OF TRIVALENT AND TETRAVALENT ACTINOIDS FROM TRIVALENT LANTHANOIDS USING HYBRID DONOR TYPE EXTRACTANT HAVING FUNCTIONAL GROUP CARRYING ACTIVE OXYGEN AND NITROGEN ATOMS

CROSS REFERENCE TO RELATED APPLICATIONS

This application claims the benefit under 35 U.S.C. Section 371, of PCT International Application Number PCT/JP2007/074950, filed Dec. 26, 2007 and Japanese Application No. 2006-349646 filed Dec. 26, 2006 in Japan, the contents of which are incorporated herein by reference.

TECHNICAL FIELD

This invention relates to a method for selectively separating and recovering the tetravalent actinoid, plutonium (Pu (IV)) and the trivalent actinoids, americium (Am (III)) and curium (Cm (III)), which are present in a nitric acid solution of nuclear spent fuels (SF) produced by nuclear power generation, from trivalent lanthanoids (Ln (III)) similarly present in the nitric acid solution.

BACKGROUND ART

Currently, the PUREX process has found practical use as a method for separating and recovering plutonium from nuclear spent fuels (SF). This method is a method which comprises dissolving SF substances in a nitric acid solution, separating uranium (VI) and plutonium (IV) from nuclear fission products by the solvent extraction method using an organic solvent containing tributyl phosphate (TBP), and then separating plutonium (IV) from uranium (VI).

Americium (III) and curium (III), on the other hand, have so far been handled as high-level wastes, rather than reprocessed and recycled as has been plutonium (IV). Available as a method for separating transuranics (TRU) including americium (III) and curium (III) from high-level waste liquors is a wet separation process such as the solvent extraction method using CMPO (carbamoylmethylphosphine oxide), DIDPA (diisodecylphosphoric acid), or the like.

Further available is a method targeting a solution of nuclear spent fuels from a power generating reactor, the method comprising separating and recovering only uranium (VI) in a first extraction stage; separating and recovering all of the remaining actinoids, namely, neptunium (V), plutonium (IV), americium (III) and curium (III), in a second extraction stage; separately denitrating the resulting two actinoid solutions, i.e., a uranium(VI)-containing solution and an actinoid-containing solution; converting them into highly soluble oxide solids; and storing the oxide solids for a subsequent demand (see Patent Document 1).

Patent Document 1: JP-A-2002-243890
Patent Document 2: JP-A-2005-214706

DISCLOSURE OF THE INVENTION

Problems to be Solved by the Invention

With the conventional PUREX process, plutonium (IV) needs to be adjusted to plutonium (III), which is not extracted into an organic phase, when plutonium (IV) is to be separated. Thus, valence adjustment for changing plutonium (IV) to plutonium (III) has been made using a reducing agent. As the reducing agent, iron (II), uranium (IV)(uranous) or hydroxylamine ($NH_2OH$), for example, is usually used.

However, these reducing agents are easily oxidizable with nitrous acid formed from nitric acid, and thus they are unstable in the presence of nitric acid. To avoid this oxidation reaction, it is necessary to add a nitrous acid decomposing agent, such as hydrazine ($NH_2$-$NH_2$), to a nitric acid solution. However, the use of such a type of reagent is extremely difficult, if a nitric acid solution such as that of spent fuels contains technetium. This is because tributyl phosphate extracts a large amount of technetium present in a solution having the nuclear spent fuels dissolved therein. The presence of this technetium promotes the oxidative destruction of hydrazine by nitrous acid. Thus, hydrazine which stabilizes the reducing agent for Pu (IV) is consumed, causing the following problem: The oxidation of the reducing agent proceeds to decrease the reduction efficiency of plutonium, inhibiting back extraction into the aqueous solution.

The role of hydrazoic acid, which is the decomposition product of hydrazine resulting from the use of hydrazine is also regarded as problematical. That is, hydrazoic acid, which has extremely high volatility and is extracted into an organic solvent, forms an unstable or explosive salt, and its ammoniacal compound exhibits similar properties, although not to such an extent as done by hydrazoic acid. The increased risk of explosion within nuclear spent fuel reprocessing facilities is clearly undesirable for process control and facilities management.

Furthermore, the conventional PUREX process uses tributyl phosphate (TBP) which is an organophosphorus compound. Thus, phosphorus (P) occurs as a residue in the incineration of the compound, leading to the formation of a secondary waste.

Besides, CMPO and DIDPA used during the separation of the aforementioned TRU are both organophosphorus ligands. As in the PUREX process, therefore, they leave phosphorus (P) as a residue in the incineration of the compounds, posing the problem of producing a secondary waste.

As described in Patent Document 1, the method of separately denitrating the uranium-containing solution and the other actinoid-containing solution after separation, and converting them into highly soluble oxide solids for storage also uses tributyl phosphate (TBP), as does the conventional PUREX process, in order to separate plutonium from the other actinoid-containing product. Thus, this method involves the same problem as mentioned above.

Further, a process such as group separation (TRU separation +recovery of useful elements) has been devised in connection with the separation of TRU. However, trivalent actinoids and trivalent lanthanoids have the same ionic radius and the same valence, showing the same chemical behavior. Because of their chemical properties, therefore, they are very difficult to separate. Trivalent lanthanoids, which are present in wastes as nuclear fission products, are coexistent in amounts as large as about 15 to 20 times those of americium (III) and curium (III). In the separation and transmutation of americium and curium in a fast breeder reactor (FBR) or an accelerator driven subcritical system (ADS), the copresence of lanthanoids having large neutron absorption cross-sections is directly linked to decreases in the nuclear transmutation efficiency of TRU. Thus, the creation of a new compound has been considered necessary for actinoid/lanthanoid separation.

For actinoid/lanthanoid separation, the following methods using the compounds of 1 to 6 indicated there have been known:

(1) Method using D2EHPA and DTPA

This is a method for separating actinoids from lanthanoids with the use of an organic solvent containing the organophosphorus compound di-2-ethylhexylphosphoric acid (D2EHPA) and diethylenetriamine-N,N,N',N'-pentaacetic acid (DTPA). With this method, however, the pH dependence of the aqueous solution is so great that a buffering agent is required for pH adjustment.

(2) Method using CYANEX301

This is a method for separating americium from europium by use of di(2,4,4-trimethylphenyl)-dithiophosphoric acid (CYANEX301) which is an organophosphorus compound. However, CYANEX-301 is chemically low in stability and, to exclude the influence of impurities such as decomposition products, its reagent purity needs to be 99% or higher.

(3) Method using TPTZ

This is a method for separating americium (III) from europium (III) by use of an organic solvent containing tris-(2,4,6-(2-pyridyl))-1,3,5-triazine (TPTZ) having a nitrogen donor and dinonyl-naphthalenesulfonic acid (HDNNS). However, HDNNS having a sulfonic group is a surface active agent, and has very poor properties of phase separation between an organic phase and an aqueous phase.

(4) Method using BTP

This is a method for separating americium from europium by use of a derivative of bis-triazinyl-pyridine (BTP) (official name: 2,6-di[5,6-alkyl-1,2,4-triazin-3-yl]pyridine)) having a nitrogen donor. However, BTP or the like has low radiation resistance and low chemical resistance.

(5) Method using BMPPT and DPPHEN

This is a method for separating americium from europium by utilizing a synergistic effect attributed to 4-benzoyl-2,4-dihydro-5-methyl-2-phenyl-3H-pyrazole-3-thione (BMPPT) which is a sulfur-based compound, and 4,7-diphenyl-1,10-phenanthroline (DPPHEN) which is a nitrogen donor compound. However, the chemical stability of BMPPT is so low that for its enhanced separating effect, it needs DPPHEN as a reagent for imparting a synergistic effect.

(6) Method using TPEN and D2EHPA

This is a method for separating americium (III) from europium (III) by use of a mixture of N,N,N',N'-tetramethyl-pyridylethylenediamine (TPEN) which is a nitrogen donor-based compound, and di-2-ethylhexylphosphoric acid (D2EHPA) which is an organophosphorus compound. However, the aqueous phase in an extraction needs to be adjusted to pH 3 or higher, and the addition of a buffering agent or the like is required.

With the compounds in 1, 2 and 6 above, however, the organophosphorus compounds are used. Thus, as with the PUREX process, phosphorus (P) remains as a residue in the incineration of the compounds, resulting in the problem of producing a secondary waste.

With the nitrogen donor compounds and the sulfur donor compounds concerned with 3, 4 and 5 above, the properties of separating americium (III) from europium (III) are pursued, thus complicating the compounds themselves, increasing the costs of development and synthesis, and decreasing economic efficiency. Further, the acid concentration of the aqueous solution needs to be adjusted to the pH region and, when a high-level liquid waste from reprocessing is used as a primary solution, the adjustment of the acid concentration (dilution) leads to an increase in the solution to be treated. Thus, the simplification of the process cannot be expected. Even if the high-level liquid waste is temporarily stored in the form of oxides, their adjustment to the pH region is difficult, and the addition of a pH buffer or the like is needed.

With the conventional processing of spent fuels, uranium and plutonium which can be recycled are separated and recovered for recycling. It has also been contemplated to apply separation and nuclear transmutation technologies to americium and curium, which are long-lived α radionuclides, derived from high-level radioactive wastes as remaining solutions, and performing geological disposal of the transmuted nuclides together with other nuclear fission products.

However, this methodology requires two major chemical plants for reprocessing and high-level liquid waste treatment, and is problematical from the aspect of an environmental load associated with the formation of wastes, and from the viewpoint of economy such as the cost of construction. Moreover, the isolation of nuclear fissionable plutonium and uranium involved in the methodology is also problematical from the point of view of nuclear proliferation properties.

The present invention has been accomplished to solve the above-described problems. It is an object of the invention to provide a method for selectively separating and recovering the tetravalent actinoid plutonium (IV) and the trivalent actinoids americium (III) and curium (III) from nuclear fission products such as trivalent lanthanoids (III) in a simple and less costly manner without using an organophosphorus compound.

MEANS FOR SOLVING THE PROBLEMS

That is, the method for separating and recovering trivalent and tetravalent actinoids according to the present invention is characterized by selectively separating and recovering plutonium (IV) and americium (III) and curium (III) from lanthanoids (III) from a nitric acid solution containing radionuclides with the use of an extractant having a functional group with neutral multidentate ligand activity which is a hybrid donor type organic compound having both donor atoms, i.e., an oxygen atom and an aromatic nitrogen atom effectively binding to curium and americium.

The above extractant is preferably

[Chemical Formula 1]

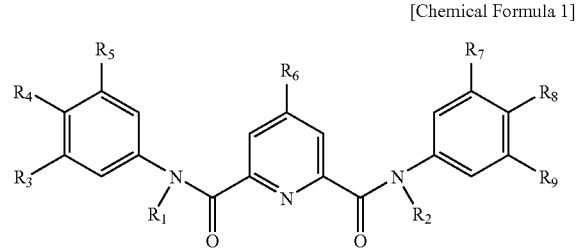

an N,N'-dialkyl-N,N'-di(alkyl)phenyl(-alkyl)-2,6-pyridinedicarboxamide (PDA) of the above formula 1 where $R_1$ and $R_2$ each represent $C_nH_{2n+1}$, and $R_3$ to $R_9$ each represent hydrogen or $C_nH_{2n+1}$, n denoting an integer, or

[Chemical Formula 2]

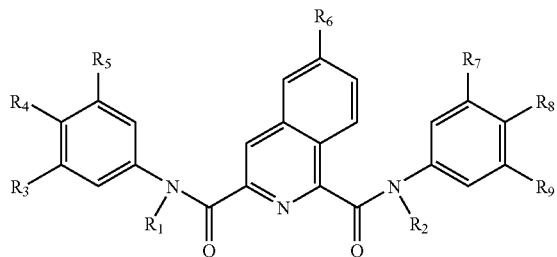

an N,N'-dialkyl-N,N'-di(alkyl)phenyl(-alkyl)-1,3-isoquinolinedicarboxamide (iQDA) of the above formula 2 where $R_1$ and $R_2$ each represent $C_nH_{2n+1}$, and $R_3$ to $R_9$ each represent hydrogen or $C_nH_{2n+1}$, n denoting an integer, or

[Chemical Formula 3]

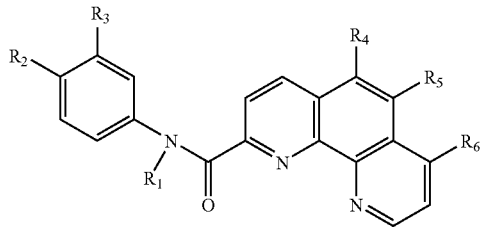

an N-alkyl-N-(alkyl)phenyl-1,10-phenanthroline-2-carboxamide (PTA) of the above formula 3 where $R_1$ represents $C_nH_{2n+1}$, and $R_2$ to $R_6$ each represent hydrogen or $C_nH_{2n+1}$, n denoting an integer.

Of the above-mentioned compounds, PDA or iQDA is preferably dissolved in chloroform and used, when $R_1$ and $R_2$ each represent a methyl group, and $R_3$ to $R_9$ each represent hydrogen; or it is preferably dissolved in an aliphatic compound and used, when $R_1$ and $R_2$ each represent a methyl group, and $R_3$ to $R_9$ each represent a hexyl group or an octyl group. On the other hand, PTA is preferably dissolved in chloroform or the like and used, when $R_1$ represents a methyl group, and $R_2$ to $R_6$ each represent hydrogen; or it is preferably dissolved in an aliphatic compound and used, when $R_1$ represents an octyl group, and $R_2$ to $R_6$ each represent hydrogen or an alkyl group.

ADVANTAGES OF THE INVENTION

The method for separating and recovering trivalent and tetravalent actinoids according to the present invention makes it possible to selectively separate and recover the tetravalent actinoid plutonium (IV) and the trivalent actinoids americium (III) and curium (III) from nuclear fission products such as trivalent lanthanoids (III), etc. in a simple and less costly manner without using an organophosphorus compound while integrating reprocessing and high-level waste liquor treatment.

BRIEF DESCRIPTION OF THE DRAWINGS

FIG. 1 is a flowchart showing an embodiment of the method for separating and recovering trivalent and tetravalent actinoids according to the present invention.

BEST MODE FOR CARRYING OUT THE INVENTION

FIG. 1 shows a flowchart of the method for separating and recovering trivalent and tetravalent actinoids according to the present invention.

First of all, spent fuels from a light water reactor (BWR, PWR, APWR), a fast reactor (FR), and a fast breeder reactor (FBR) are dissolved in a nitric acid solution to prepare a solution of the spent fuels (step a). The nitric acid solution of the spent fuels is preferably in a concentration range of 0.01 M to 4.0 M, in particular, as a range which enables plutonium (VI), americium (III) and curium (III) to separate lanthanoids (III).

The concentration ranges of the trivalent and tetravalent actinoids are 10 to 20 mM for plutonium (IV), 0.5 to 0.6 mM for americium (III), and 0.06 to 0.07 mM for curium (III) in the case of a light water reactor fuel (50,000 MWT/t, cooled for 4 years). The concentration ranges of the trivalent and tetravalent actinoids are 100 to 200 mM for plutonium (IV), 30 to 50 mM for americium (III), and 10 to 20 mM for curium (III) in the case of the fast breeder reactor (MOX fuel, 150,000 MWT/t, cooled for 4 years, Pu enrichment 30 wt. % or less).

Then, uranium (VI) is selectively separated from the solution of the spent fuels with the use of a monoamide-based compound having a branched alkyl group (step b) (see Patent Document 2).

Then, a solution of PDA or iQDA or PTA dissolved in an aliphatic solvent is used as an extractant on the nitric acid solution subjected to high decontamination of uranium (VI) to recover plutonium (IV), americium (III) and curium (III), which are present in the solution, from nuclear fission products such as trivalent lanthanoids by solvent extraction and separation, for example (step c).

Here, PDA or iQDA is dissolved in chloroform and used, when $R_1$ and $R_2$ each represent a methyl group, and $R_3$ to $R_9$ each represent hydrogen; or it is dissolved in aliphatic compounds and used, when $R_1$ and $R_2$ each represent a methyl group, and $R_3$ to $R_9$ each represent a hexyl group or an octyl group. On the other hand, PTA is dissolved in chloroform or the like and used, when $R_1$ represents a methyl group, and $R_2$ to $R_6$ each represent hydrogen; or it is dissolved in aliphatic compounds and used, when $R_1$ represents an octyl group, and $R_2$ to $R_6$ each represent an alkyl group.

The PDA, iQDA or PTA is used, dissolved in chloroform or an aliphatic hydrocarbon, such as dodecane, or an N,N-dialkylamide or the like, in a concentration of 0.1 to 0.5 M respectively. As a multi-stage extractor, a mixer-settler, a pulsed column or, because of a high radioactivity concentration, a centrifugal extractor is used.

The above extractant has the advantages indicated below, in comparison with tributyl phosphate in the aforementioned PUREX:

(i) The hybrid donor type organic compound can simultaneously separate and recover plutonium (IV) and americium (III) from the nuclear fission products contained in the nitric acid solution. This makes their diversion to nuclear weapons technically difficult, and can maintain resistance for ensuring nuclear non-proliferation.

(ii) There is no need to adjust plutonium (IV) to trivalent plutonium, which is not extracted with tributyl phosphate used in the PUREX process, as in the conventional uranium/plutonium separation. Instead, plutonium (IV) and americium (III) can be selectively separated and recovered from the solution of the nuclear spent fuels. Thus, the step of reducing plutonium (IV) can be eliminated, and simplification of the process can be achieved. Nor is a reducing agent or a stabilizing agent added. Thus, it is not necessary to consider a secondary or tertiary reaction ascribed to the addition of a reducing agent or a stabilizing agent.

(iii) Only americium (III) and plutonium (IV) can be extracted selectively from the solution in which americium (III) and trivalent lanthanoids, which have the same ionic radius and the same valence, are coexistent. Thus, the TRU separation step in the conventional group separation can be simplified. The fact that plutonium (IV) and americium (III) can be simultaneously separated and recovered is advantageous in that they can be directly introduced into separation and transmutation technologies, without being further treated.

(iv) PDA, iQDA and PTA, which are hybrid donor type organic compounds, are composed of carbon, hydrogen, oxygen and nitrogen. They do not generate solid wastes upon gasification by incineration, and this leads to a reduction in an environmental load, such as decreases in wastes.

Further, only nuclear fission products are contained in the liquid waste rid of plutonium (IV), americium (III) and curium (III). From them, exothermic Sr and Cs with long half-lives are separated, and subjected to intermediate storage (step d).

Finally, the extraction residue (low-level nuclear fission products) is vitrified (step e).

In the present invention, plutonium (IV) and americium (III) are selectively separated and recovered from nuclear fission products by use of the solvent extraction methods applied to wide ranges of nitric acid solutions containing radionuclides. For this purpose, PDA, iQDA or PTA, which is a hybrid donor type organic compound having both of an oxygen atom and a nitrogen atom as donor atoms, is used as an extractant, thereby presenting the following advantages:

(1) There is no need to isolate plutonium (IV) as in the conventional PUREX process, and plutonium (IV) is managed as the same fraction and solution as americium (III) and curium (III) having high specific activity. This makes its diversion to nuclear weapons technically difficult, and can maintain resistance for ensuring nuclear non-proliferation.

(2) It is not necessary to add a reducing agent or the like in separating plutonium (IV), as in the conventional PUREX process. Thus, a potential danger of an associated secondary or tertiary reaction can be eliminated.

(3) The use of PDA, iQDA or PTA enables actinoids including plutonium (IV) and lanthanoids to be separated by a single operation. This has been able to cut the conventional TRU separation step and actinoid-lanthanoid separation step, and achieve considerable simplification of the process.

(4) The conventional PUREX process and TRU separation have used TBP and CMPO which are organophosphorus compounds. Thus, phosphorus (P) remains as a residue after incineration of the compounds, eventually forming secondary wastes. By contrast, PDA, iQDA and PTA have carbon, nitrogen, oxygen and hydrogen as their constituent elements, and can be completely incinerated in waste solvent treatment. This leads to decreases in solid wastes generated secondarily, and can be expected to lighten an environmental load.

EXAMPLES

Example 1

From an aqueous solution of nitric acid containing a trace amount of plutonium (IV), the above plutonium (IV) was extracted with an extraction solvent which was a chloroform solution containing 0.5 M of N,N'-dimethyl-N,N'-diphenyl-2,6-pyridinedicarboxamide (PDA). The distribution ratio $D_{Pu}$, upon extraction, of plutonium (IV) at equilibrium was $D_{Pu}$=10.2 and 42.5 at nitric acid concentrations of 3.0 M and 5.0 M, respectively. At a nitric acid concentration of 1.0 M, on the other hand, $D_{Pu}$=0.14. As noted here, the use of the nitric acid solution in a concentration of 1.0 M or lower was successful in recovering plutonium (IV) efficiently by back extraction.

Example 2

From an aqueous solution of nitric acid containing a trace amount of uranium, the above uranium was extracted with an extraction solvent which was a chloroform solution containing 0.5 M of N,N'-dimethyl-N,N'-diphenyl-2,6-pyridinedicarboxamide (PDA). The distribution ratio $D_U$, upon extraction, of uranium (VI) at equilibrium was $D_U$=0.17 at a nitric acid concentration of 3.0 M. It turned out that uranium (VI) was not extracted in the nitric acid concentration range used in nuclear fuel reprocessing.

Example 3

From an aqueous solution of nitric acid containing trace amounts of trivalent americium and trivalent europium (Eu), the above americium (III) and europium (III) were extracted with an extraction solvent which was a chloroform solution containing 0.5 M of N,N'-dimethyl-N,N'-diphenyl-2,6-pyridinedicarboxamide (PDA). The distribution ratios $D_{Am}$ and $D_{Eu}$, upon extraction, of americium (III) and europium (III) at equilibrium were $D_{Am}$=1.3 and $D_{Eu}$=0.25 at a nitric acid concentration of 3.0 M. Thus, only americium was successfully separated and recovered selectively.

Example 4

From an aqueous solution of nitric acid containing trace amounts of trivalent americium and trivalent europium (Eu), the above americium (III) and europium (III) were extracted with an extraction solvent which was a chloroform solution containing 0.5 M of N-octyl-N-methylphenyl-1,10-phenanthroline-2-carboxamide (PTA). The distribution ratios $D_{Am}$ and $D_{Eu}$, upon extraction, of americium (III) and europium (III) at equilibrium were $D_{Am}$=6 and $D_{Eu}$=0.3 at a nitric acid concentration of 1.0 M. Thus, only americium was successfully separated and recovered selectively.

INDUSTRIAL APPLICABILITY

The present invention can be used mainly in the fields of reprocessing for a nuclear fuel cycle and high-level waste treatment, and can be utilized as a technology for simplifying the conventional PUREX process and TRU separation. In fuel production for a fast breeder reactor fuel, moreover, the present invention facilitates a shift to a process for production of a mixed fuel consisting of plutonium (IV), americium (III) and curium (III). Furthermore, the present invention can contribute as an alternative to an advanced wet separation technology proposed in the feasibility studies on a commercialized FBR cycle system.

The invention claimed is:
1. A method for separating and recovering trivalent and tetravalent actinoids, the method comprising:
dissolving spent fuels from a nuclear power reactor into a nitric acid solution to prepare a spent fuel solution;

selectively separating uranium (VI) from the spent fuel solution with a monoamide-based compound having branched alkyl groups; and extracting plutonium (IV), americium (III) and curium (III), which are present in the spent fuel solution, from trivalent lanthanoids in the spent fuel solution with a solution of a neutral multidentate ligand extractant, which is a hybrid donor organic compound having a functional group containing both an active oxygen atom and an active nitrogen atom, to recover trivalent and tetravalent actinoids.

2. The method for separating and recovering trivalent and tetravalent actinoids according to claim 1, wherein the extractant is a compound of

[Chemical Formula 1]

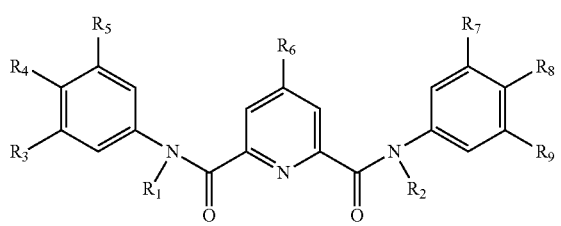

where $R_1$ and $R_2$ each represent $C_nH_{2n+1}$, and $R_3$ to $R_9$ each represent hydrogen or $C_nH_{2n+1}$, n denoting an integer, or

[Chemical Formula 2]

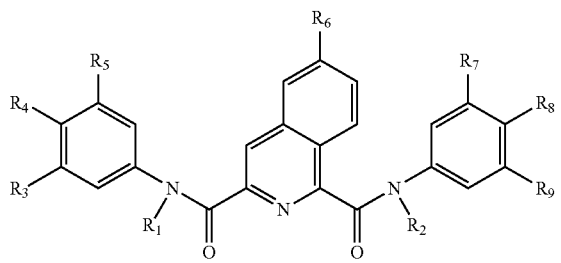

where $R_1$ and $R_2$ each represent $C_nH_{2n+1}$, and $R_3$ to $R_9$ each represent hydrogen or $C_nH_{2n+1}$, n denoting an integer, or

[Chemical Formula 3]

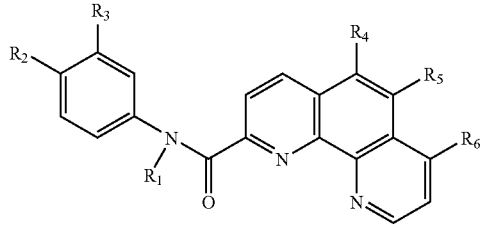

where $R_1$ represents $C_nH_{2n+1}$, and $R_2$ to $R_6$ each represent hydrogen or $C_nH_{2n+1}$, n denoting an integer.

3. The method for separating and recovering trivalent and tetravalent actinoids according to claim 2, wherein the compound of the [Chemical Formula 1] or [Chemical Formula 2] is dissolved in chloroform, when $R_1$ and $R_2$ each represent a methyl group, and $R_3$ to $R_9$ each represent hydrogen; or is dissolved in an aliphatic compound or aliphatic compounds, when $R_1$ and $R_2$ each represent a methyl group, and $R_3$ to $R_9$ each represent a hexyl group or an octyl group, and the compound of the [Chemical Formula 3] is dissolved in chloroform, when $R_1$ represents a methyl group, and $R_2$ to $R_6$ each represent hydrogen or an alkyl group; or is dissolved in an aliphatic compound or aliphatic compounds, when $R_1$ represents an octyl group, and $R_2$ to $R_6$ each represent hydrogen or an alkyl group.

4. The method for separating and recovering trivalent and tetravalent actinoids according to claim 1, wherein a concentration of the nitric acid solution is 0.01 M to 4.0 M.

* * * * *